I. GRAVES.
MACHINE FOR CROZING STAVES.
No. 173,781. Patented Feb. 22, 1876.
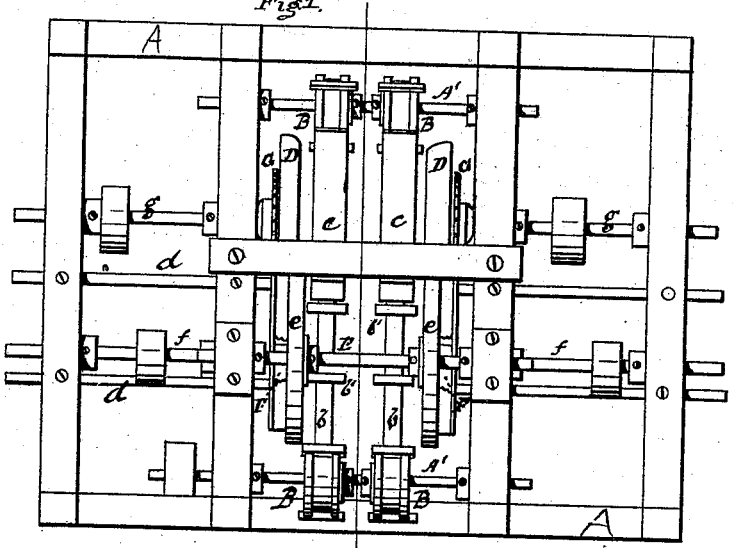
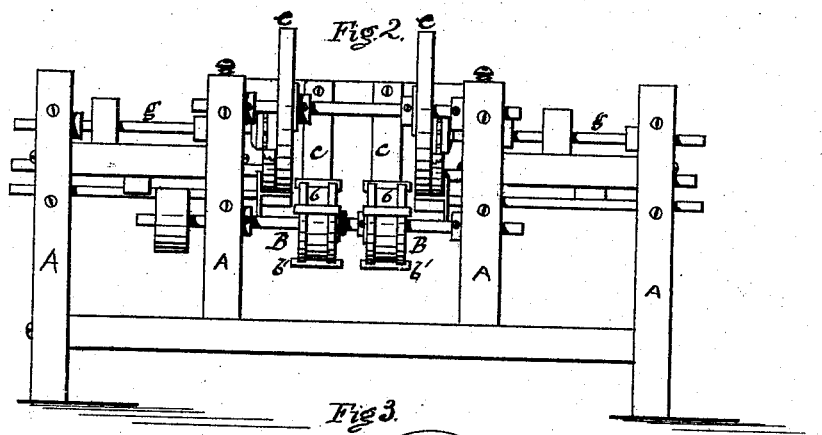
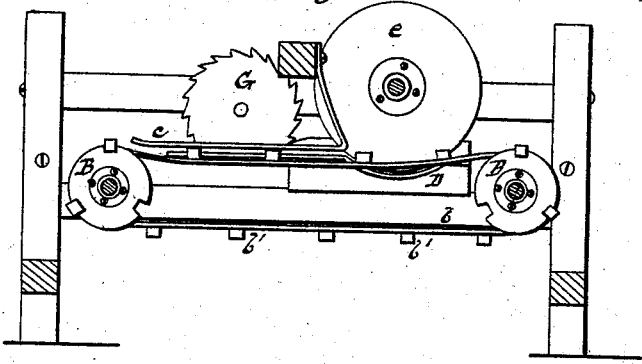
Witnesses:
F. B. Townsend.
Henry W. Elliott.
Inventor:
Israel Graves
per Atty.
A. H. Evans & Co.

UNITED STATES PATENT OFFICE.

ISRAEL GRAVES, OF MINNEAPOLIS, MINN., ASSIGNOR OF TWO-THIRDS HIS RIGHT TO J. D. PUTNAM & CO., OF RIVER FALLS, WISCONSIN, AND HARRY B. CORNISH AND CHARLES P. HUNT, OF MINNEAPOLIS, MINNESOTA.

IMPROVEMENT IN MACHINES FOR CROZING STAVES.

Specification forming part of Letters Patent No. 173,781, dated February 22, 1876; application filed September 3, 1875.

*To all whom it may concern:*

Be it known that I, ISRAEL GRAVES, of Minneapolis, Minnesota, have invented certain new and useful Improvements in Machines for Crozing Staves, of which the following is a clear, full, and exact description, reference being had to the accompanying drawings, making a part of this specification, in which—

Figure 1 is a perspective view of my invention. Fig. 2 is a top view of same. Fig. 3 is a section through the line $x\ x$. Fig. 4 is a section through the line $y\ y$.

My invention relates to that class of machines designed for finishing barrel-staves; and it consists in the several combinations and arrangement of devices hereinafter described and claimed.

In order that others skilled in the art may make and use my invention, I will proceed to describe the exact manner in which I have carried it out.

In the drawings, A A represent the frame-work to sustain the mechanism, and furnish bearings for the several shafts. On the shafts A' A' are secured the pulleys B B, over which are worked the endless belts $b\ b$, provided with the rests $b'\ b'$. Attached to the cross-beam C are two spring-guides, $c\ c$, located immediately above the endless belts $b\ b$, to hold the staves down on the rests D D while the saws cut them to their proper length. The rests D D are secured to the frame-work, by means of the bolts or rods $d\ d$, in a position outside and parallel with the endless belts $b\ b$, and are curved near their rear ends to correspond with the external diameter of the casks to be made. On the shaft E are secured the presser-rollers $e\ e$, which cause the staves to pass through an arc of a circle in the curved portion of the rests D D, during which time the revolving cutters F F, secured to the shafts $f\ f$, completely finish the ends of the staves ready for setting up. The saws G G, secured to the shafts $g\ g$, trim the staves to the desired length as they pass under the guards $c\ c$ and along the rest D D. The pulleys B B, cutters F F, presser-rollers $e\ e$, and saws G G, are all made adjustable on their respective shafts, so as to adapt them to any length of stave to be finished. To finish staves for different diameters, different rollers and different curved rests must be used suited to each. The shafts $a\ a$, $g\ g$, and $f\ f$ are provided with pulleys, so as to receive motion from proper band-connections.

The operation of my machine is as follows: A stave is laid across the pulleys B B, and is carried forward on the endless belts $b\ b$, by means of the guides $b'\ b'$, under the spring-guides $c\ c$ and upon the rests D D, until they are brought in contact with the circular saws G G, which have been adjusted to the exact length required for the stave, which is then carried on by the same means into the curved portion of the rests, where it is held by the presser-rollers $e\ e$ while the revolving cutters F F finish the ends of the stave ready for setting up.

Having thus described my invention, what I claim as new, and desire to secure by Letters Patent, is—

The pulleys B B and endless belts $b\ b$, provided with the guides $b'\ b'$, in combination with the spring-guards $c\ c$, curved rests D D, saws G G, presser-rollers $e\ e$, and revolving cutters F F, all constructed to operate substantially as and for the purpose set forth.

In testimony that I claim the foregoing I have hereunto set my hand.

ISRAEL GRAVES.

Witnesses:
S. P. GILLESPIE,
VERNON BELL.